United States Patent
Hiramatsu

(10) Patent No.: US 9,212,076 B2
(45) Date of Patent: Dec. 15, 2015

(54) SLUDGE PROCESSING SYSTEM AND STORAGE MEDIUM STORING A PROGRAM FOR CONTROLLING OPERATION OF A SLUDGE PROCESSING SYSTEM BASED ON MOISTURE CONTENT OF CONCENTRATED SLUDGE

(71) Applicant: TOMOE ENGINEERING CO., LTD., Tokyo (JP)

(72) Inventor: Tatsuo Hiramatsu, Tokyo (JP)

(73) Assignee: TOMOE ENGINEERING CO., LTD., Tokyo (JP)

( * ) Notice: Subject to any disclaimer, the term of this patent is extended or adjusted under 35 U.S.C. 154(b) by 158 days.

(21) Appl. No.: 13/932,229

(22) Filed: Jul. 1, 2013

(65) Prior Publication Data
US 2014/0155245 A1   Jun. 5, 2014

(30) Foreign Application Priority Data

Jul. 3, 2012   (JP) ................. 2012-149412
Oct. 24, 2012  (JP) ................. 2012-234967
Dec. 21, 2012  (JP) ................. 2012-279755

(51) Int. Cl.
*C02F 11/12*   (2006.01)
*B04B 11/02*   (2006.01)
(Continued)

(52) U.S. Cl.
CPC ............ *C02F 11/127* (2013.01); *F23G 7/001* (2013.01); *B04B 1/20* (2013.01); *B04B 11/02* (2013.01);
(Continued)

(58) Field of Classification Search
CPC .. C02F 11/127; C02F 11/06; C02F 2209/005; F23G 7/001; B04B 1/20; B04B 9/08; B04B 11/02; B04B 13/00

USPC ............................................. 494/5, 7, 53, 84
See application file for complete search history.

(56) References Cited

U.S. PATENT DOCUMENTS 5,557,873 A  *  9/1996  Lynam et al. ................... 34/379
5,643,169 A  *  7/1997  Leung et al. ................... 494/53
(Continued)

FOREIGN PATENT DOCUMENTS

JP    02-071859    3/1990
JP    04-171066    6/1992
(Continued)

OTHER PUBLICATIONS

JP 10337598A abstract Dec. 1998.*
(Continued)

*Primary Examiner* — Charles Cooley
*Assistant Examiner* — Shuyi S Liu
(74) *Attorney, Agent, or Firm* — Young & Thompson

(57) ABSTRACT

Disclosed is a sludge processing system having a centrifugal separator which concentrates the sludge and a furnace which heat-treats the concentrated sludge, and allows the automatic control in which the operational condition of the centrifugal separator is set to the optimal condition in accordance with the operational state of the furnace. The control device sets a variable range of a differential speed between the bowl and the screw conveyor of the centrifugal separator, and performs a variable control of the differential speed so that the measurements concentration moisture of the concentration sludge achieves a moisture content requested by the furnace within the variable range, when the measurements concentration moisture of the concentration sludge maintains the moisture content requested by the furnace for a certain period of time being previously set, changes a control value of the centrifugal force.

11 Claims, 10 Drawing Sheets

(51) Int. Cl.
  *B04B 13/00* (2006.01)
  *B04B 1/20* (2006.01)
  *F23G 7/00* (2006.01)
  *C02F 11/06* (2006.01)
  *C02F 11/14* (2006.01)

(52) U.S. Cl.
  CPC ............... *B04B 13/00* (2013.01); *C02F 11/06* (2013.01); *C02F 11/14* (2013.01); *C02F 2209/005* (2013.01)

(56) References Cited

U.S. PATENT DOCUMENTS

| | | | |
|---|---|---|---|
| 6,615,710 B1 * | 9/2003 | Ishigaki et al. | 100/111 |
| 2009/0057235 A1 * | 3/2009 | Sugaya et al. | 210/709 |
| 2009/0199748 A1 * | 8/2009 | Dangtran et al. | 110/244 |
| 2011/0278208 A1 * | 11/2011 | Namba et al. | 210/88 |

FOREIGN PATENT DOCUMENTS

| | | | | |
|---|---|---|---|---|
| JP | 06-320200 | | 11/1994 | |
| JP | 09-216000 | | 8/1997 | |
| JP | 10337598 A | * | 12/1998 | ............ C02F 11/12 |
| JP | 2000-202495 | | 7/2000 | |
| JP | 2000-218292 | | 8/2000 | |
| JP | 2002019920 A | * | 1/2002 | ............ B65G 1/133 |
| JP | 2002-273495 | | 9/2002 | |
| JP | 2004109004 A | * | 4/2004 | ............ G01M 11/00 |
| JP | 2006-002945 | | 1/2006 | |
| JP | 2006-015173 | | 1/2006 | |
| JP | 2008105984 A | * | 5/2008 | |
| JP | 2009-214088 | | 9/2009 | |
| JP | 2011-230040 | | 11/2011 | |

OTHER PUBLICATIONS

JP 2002019920A abstract Jan. 2002.*
JP 2004109004A abstract Apr. 2004.*
JP 2008105984A abstract May 2008.*

* cited by examiner

FIG. 6
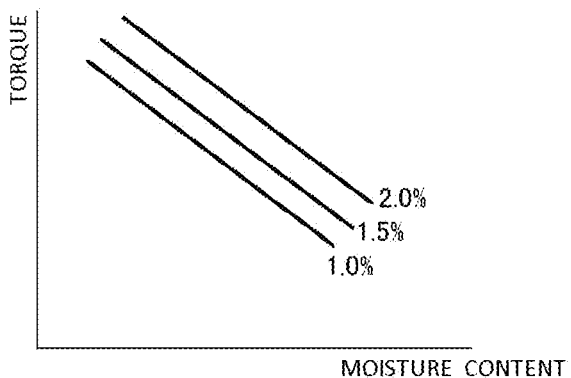
(a) CENTRIFUGAL FORCE 2000G
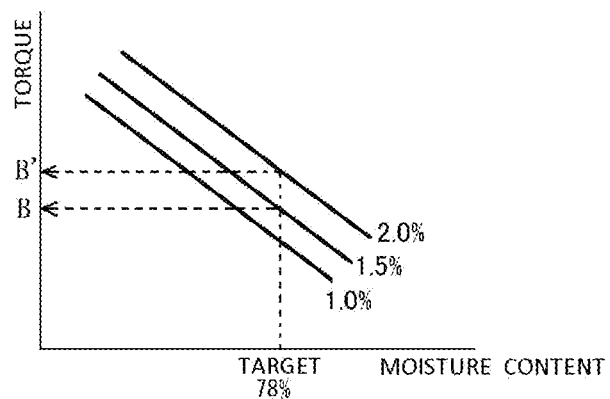
(b) CENTRIFUGAL FORCE 1900G
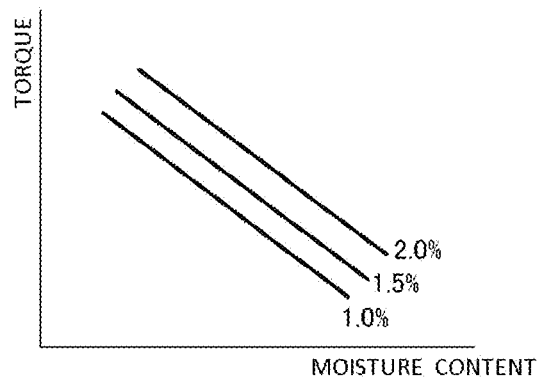
(c) CENTRIFUGAL FORCE 1800G

SLUDGE PROCESSING SYSTEM AND STORAGE MEDIUM STORING A PROGRAM FOR CONTROLLING OPERATION OF A SLUDGE PROCESSING SYSTEM BASED ON MOISTURE CONTENT OF CONCENTRATED SLUDGE

TECHNICAL FIELD

The present invention relates to a sludge processing system including a centrifugal separator which concentrates the sludge and a furnace which heat-treats the concentrated sludge, in particular to a technique for performing an automatic control on the centrifugal separator in accordance with a heat-treatment state of the concentrated sludge.

BACKGROUND ART

The sludge resulted from any water processing for, for example, water supply and sewerage, industrial wastewater, human waste and the like is subjected to a thermal disposal within an incinerator. The sludge is preferably incinerated after a concentration processing for reducing a moisture content of the sludge. A known sludge concentration apparatus (including a case of using dehydration) includes a centrifugal separator which is also referred to as a decanter (for example, see Patent Literatures 1 and 2).

FIG. 12 shows a schematic configuration of a horizontal decanter (for example, see Patent Literatures 3, 4 and 5). As shown in FIG. 12, the horizontal decanter, which is generally designated as 100, is configured so that a bowl 101 rotatable about a horizontal shaft and a screw conveyor 102 disposed in the bowl 101 so as to coaxially rotate about the horizontal shaft of the bowl 101 are housed within a casing 103.

The bowl 101 has a conical-shaped portion at one end, and applies a centrifugal force to the sludge which is a subject to be processed. The conical-shaped portion acts as a beach portion on which the concentrated sludge conveyed by the screw conveyor 102 is separated from a liquid pool. The exhaust port 104 for the concentrated sludge is formed on a tip of the conical-shaped portion. A trunk of the bowl 101 acts as the liquid pool (pool portion) for the being processed sludge. The exhaust port 105 for the separated liquid is formed on the opposed end of the exhaust port 104. The spiral screw vane 102a and an outlet. 102b for feeding the sludge (feed sludge) into the bowl 101 are formed on the trunk of the screw conveyor 102.

In such configuration, when the sludge (feed sludge) is fed continuously into the rotating bowl 101, in the pool portion of the bowl 101, the solid contained in the sludge settles to a peripheral wall surface of the bowl 101 due to the centrifugal force. Accordingly, the screw conveyor 102 rotates at a differential speed relative to a rotation speed of the bowl 101 via a gear box 106, thereby conveying the concentrated sludge within the bowl 101 forward the beach portion. At the beach portion, the concentrated sludge is separated from the liquid pool and exhausted from the exhaust port 104 for the concentrated sludge. On the other hand, the separated liquid is overflown and exhausted from the exhaust port 105.

The bowl 101 is rotated by a main drive motor 107. The main drive motor 107 controls a rotation speed (N) of the bowl 101 though an inverter control. The screw conveyor 102 is configured so that the gear box 106 and a drive motor (back drive motor) 108 control the rotation speed to rotate as the differential speed ($\Delta N$) relative to the rotation speed of the bowl 101.

In general, the decanter 100 performs a variable control on a convey torque of the screw conveyor 102 and/or the differential speed ($\Delta N$) so that the moisture content of the concentrated sludge satisfies a predetermined target value. However, if the energy saving, the reduction of $CO_2$ emissions or the like should be promoted to realize more effective operation of the entire sludge processing system, it is not preferable to control the decanter 100 only by a single control loop. It is desired to perform the optimal operation of the decanter 100 in accordance with the operating condition of the incinerator, but there is no fact that such a control means has been implemented.

CITATION LIST

Patent Literature

Patent Literature 1: Japanese Patent Laid-Open No. 2009-214088

Patent Literature 2: Japanese Patent Laid-Open No. 2002-273495

Patent Literature 3: Japanese Patent Laid-Open No. 2011-230040

Patent Literature 4: Japanese Patent Laid-Open No. 114-171066

Patent Literature 5: Japanese Patent Laid-Open No. 116-320200

SUMMARY OF INVENTION

Problems to be Solved by the Invention

The present invention is made to solve the problems described simply as examples, the object of the invention is to provide a sludge processing system includes a centrifugal separator which concentrates the sludge and a furnace which heat-treats the concentrated sludge, and allows the automatic control in which the operational condition of the centrifugal separator is set to the optimal condition in accordance with the operational state of the furnace.

Means for Solving the Problems (1). A sludge processing system comprising:
a centrifugal separator which concentrates the sludge,
a concentration measure device which measures the moisture content of the concentration sludge exhausted from the centrifugal separator,
a furnace which heat-treats the concentrated sludge, and
an automatic control device which receives, from the furnace, the information regarding a heat-treatment state of the concentrated sludge and, controls the centrifugal separator based on the received information,
wherein the centrifugal separator includes a bowl by which centrifugal force is applied to the sludge so as to separate the sludge into the concentrated sludge and the separated liquid, a screw conveyor to convey the concentrated sludge contained in the bowl to an exhaust port, a drive motor to rotate the bowl, a differential speed generator to cause the screw conveyor to rotate at a differential speed relative to the bowl,
wherein the information received from the furnace to the automatic control device include a moisture content change request regarding the concentrated sludge, and
wherein, in response to the moisture content change request, the automatic control device controls as follow (a) to (c):

(a) the automatic control device sets a variable range of a differential speed between the bowl and the screw conveyor, and performs a variable control of the differential speed so that the measurements concentration moisture of the concentration sludge achieves a moisture content requested by the furnace within the variable range, (b) the automatic control device performs the variable control of the differential speed so that, when the differential speed varies within a certain range being previously set and the measurements concentration moisture of the concentration sludge maintains the moisture content requested by the furnace for a certain period of time being previously set, a control value of the centrifugal force is decreased as well as the measurements concentration moisture of the concentration sludge achieves the moisture content requested by the furnace in the centrifugal force being set to the new control value, and (c) the automatic control device performs the variable control of the differential speed so that, when the differential speed remains at a minimum value within the variable range and the measurements concentration moisture of the concentration sludge is higher than the moisture content requested by the furnace, the control value of the centrifugal force is increased as well as the measurements concentration moisture of the concentration sludge achieves the moisture content requested by the furnace in the centrifugal force being set to the new control value.

(2). The automatic control device further performs a control to adjust a chemical feed ratio so as to achieve the moisture content requested by the furnace.

(3). The centrifugal separator further includes a variable dam mechanism for adjusting a exhaust level of the separated liquid of the bowl, and the automatic control device further performs a control to adjust the exhaust level of the separated liquid of the bowl so as to achieve the moisture content requested by the furnace.

(4). The furnace send the moisture content change request regarding the concentrated sludge to the automatic control device based on one or more of power consumptions, $CO_2$ emissions and running costs for both of the centrifugal separator and the furnace.

(5). A sludge processing system comprising:

a centrifugal separator which concentrates the sludge, a concentration measure device which measures the moisture content of the concentration sludge exhausted from the centrifugal separator, a furnace which heat-treats the concentrated sludge, and an automatic control device which receives, from the furnace, the information regarding a heat-treatment state of the concentrated sludge and, controls the centrifugal separator based on the received information, wherein the centrifugal separator includes a bowl by which centrifugal force is applied to the sludge so as to separate the sludge into the concentrated sludge and the separated liquid, a screw conveyor to convey the concentrated sludge contained in the bowl to an exhaust, port, a drive motor to rotate the bowl, a differential speed generator to cause the screw conveyor to rotate at a differential speed relative to the bowl, wherein the information received from the furnace to the automatic control device include a moisture content of the concentrated sludge fed into the furnace and, VTS/TS (Volatile Total Solids/Total Solids) or the information required to compute the VTS/TS of the concentration sludge, the automatic control device determines either a current target value of the moisture content is maintained or a new target value is set based on VTS/TS of the concentrated sludge and controls as follow (a) to (c):

(a) the automatic control device sets a variable range of a differential speed between the bowl and the screw conveyor, and performs a variable control of the differential speed so that the measurements concentration moisture of the concentration sludge achieves a moisture content requested by the furnace within the variable range, (b) the automatic control device performs the variable control of the differential speed so that, when the differential speed varies within a certain range being previously set and the measurements concentration moisture of the concentration sludge maintains the moisture content requested by the furnace for a certain period of time being previously set, a control value of the centrifugal force is decreased as well as the measurements concentration moisture of the concentration sludge achieves the moisture content requested by the furnace in the centrifugal force being set to the new control value, and (c) the automatic control device performs the variable control of the differential speed so that, when the differential speed remains at a minimum value within the variable range and the measurements concentration moisture of the concentration sludge is higher than the moisture content requested by the furnace, the control value of the centrifugal force is increased as well as the measurements concentration moisture of the concentration sludge achieves the moisture content requested by the furnace in the centrifugal force being set to the new control value.

(6). The automatic control device further previously stores the information indicative of a correlation relationship between a moisture content of the concentrated sludge and the centrifugal force of the bowl using the VTS/TS as a parameter, and the automatic control device sets a control value of the centrifugal force of the bowl based on an optimum centrifugal force corresponding to both of the VTS/TS and the target moisture content.

(7). The automatic control device further previously stores the information indicative of a correlation relationship between the VTS/TS and a self-sustaining combustion moisture content, and the automatic control device computes the self-sustaining combustion moisture content based on the VTS/TS, and sets the computed self-sustaining combustion moisture content to a new target moisture content of the concentrated sludge.

(8). The required information to compute the VTS/TS of the concentrated sludge comprises the information about each of a used amount of a firework fuel, an amount of a feed sludge to the furnace, and a moisture content of the concentrated sludge fed into the furnace.

(9). The automatic control device further previously stores information indicative of a correlation relationship between the VTS/TS and a chemical feed ratio, and the automatic control device performs a control to adjust an amount of the chemical to be added by setting an optimum chemical feed ratio corresponding to the VTS/TS which is the received information from the furnace or the computed VTS/TS to a control value.

(10). The centrifugal separator further includes a variable dam mechanism for adjusting a exhaust level of the separated liquid of the bowl, and the automatic control device further performs a control to adjust the exhaust level of the separated liquid of the bowl so as to achieve the target, moisture content.

(11). A storage medium storing, a program for controlling an operation of a sludge processing system, the sludge processing system comprising:

a centrifugal separator which concentrates the sludge, a concentration measure device which measures the moisture content of the concentration sludge exhausted from the centrifugal separator, a furnace which heat-treats the concentrated sludge, and an automatic control device which receives, from the furnace, the information regarding a heat-treatment state of the concentrated sludge and, controls the centrifugal separator based on the received information, wherein the centrifugal separator includes a bowl by which centrifugal force is applied to the sludge so as to separate the sludge into the concentrated sludge and the separated liquid, a screw conveyor to convey the concentrated sludge contained in the bowl to an exhaust port, a drive motor to rotate the bowl, a differential speed generator to cause the screw conveyor to rotate at a differential speed relative to the bowl, wherein the information received from the furnace to the automatic control device include a moisture content change request regarding the concentrated sludge, and wherein, in response to the moisture content change request, the program for controlling the operation of the sludge processing system causes the automatic control device to perform as follow (a) to (c):

wherein, in response to the moisture content change request, the program for controlling the operation of the sludge processing system causes the automatic control device to perform as follow:

(a) the automatic control device sets a variable range of a differential speed between the bowl and the screw conveyor, and performs a variable control of the differential speed so that the measurements concentration moisture of the concentration sludge achieves a moisture content requested by the furnace within the variable range, (b) the automatic control device performs the variable control of the differential speed so that, when the differential speed varies within a certain range being previously set and the measurements concentration moisture of the concentration sludge maintains the moisture content requested by the furnace for a certain period of time being previously set, a control value of the centrifugal force is decreased as well as the measurements concentration moisture of the concentration sludge achieves the moisture content requested by the furnace in the centrifugal force being set to the new control value, and (c) the automatic control device performs the variable control of the differential speed so that, when the differential speed remains at a minimum value within the variable range and the measurements concentration moisture of the concentration sludge is higher than the moisture content requested by the furnace, the control value of the centrifugal force is increased as well as the measurements concentration moisture of the concentration sludge achieves the moisture content requested by the furnace in the centrifugal force being set to the new control value.

Advantageous Effects of Invention

According to the present invention of the sludge processing system which includes the centrifugal separator and the furnace, wherein the control device receives, from the furnace, the information regarding the heat-treatment state of the concentrated sludge and adjusts one or more control values selected from the centrifugal force applied to the sludge by the bowl of the centrifugal separator, the concentrated sludge convey torque of the screw conveyor, the differential speed between the bowl and the screw conveyor, and the chemical feed ratio. This allows the automatic control in which the operational condition of the centrifugal separator is set to the optimal condition in accordance with the operational state of the furnace. As a result, the energy saving of the entire system, the reduction of $CO_2$ emissions of the entire system, and the reduction of running costs of the entire system can be promoted.

Further, according to the present invention of the sludge processing system which includes the centrifugal separator and the furnace, the control device sets a variable range of a differential speed between the bowl and the screw conveyor of the centrifugal separator, and performs a variable control of the differential speed so that the measurements concentration moisture of the concentration sludge achieves a moisture content requested by the furnace within the variable range, when the measurements concentration moisture of the concentration sludge maintains the moisture content requested by the furnace for a certain period of time being previously set, changes a control value of the centrifugal force. This allows the automatic control in which the operational condition of the centrifugal separator is set to the optimal condition in accordance with the operational state of the furnace.

MODES FOR CARRYING OUT THE INVENTION

Now, a sludge processing system according to a preferred embodiment of the present invention will be described with reference to the attached drawings. It should be noted, however, that the technical scope of this invention should not be interpreted without any limitation through the embodiment described below.

Figure 1:
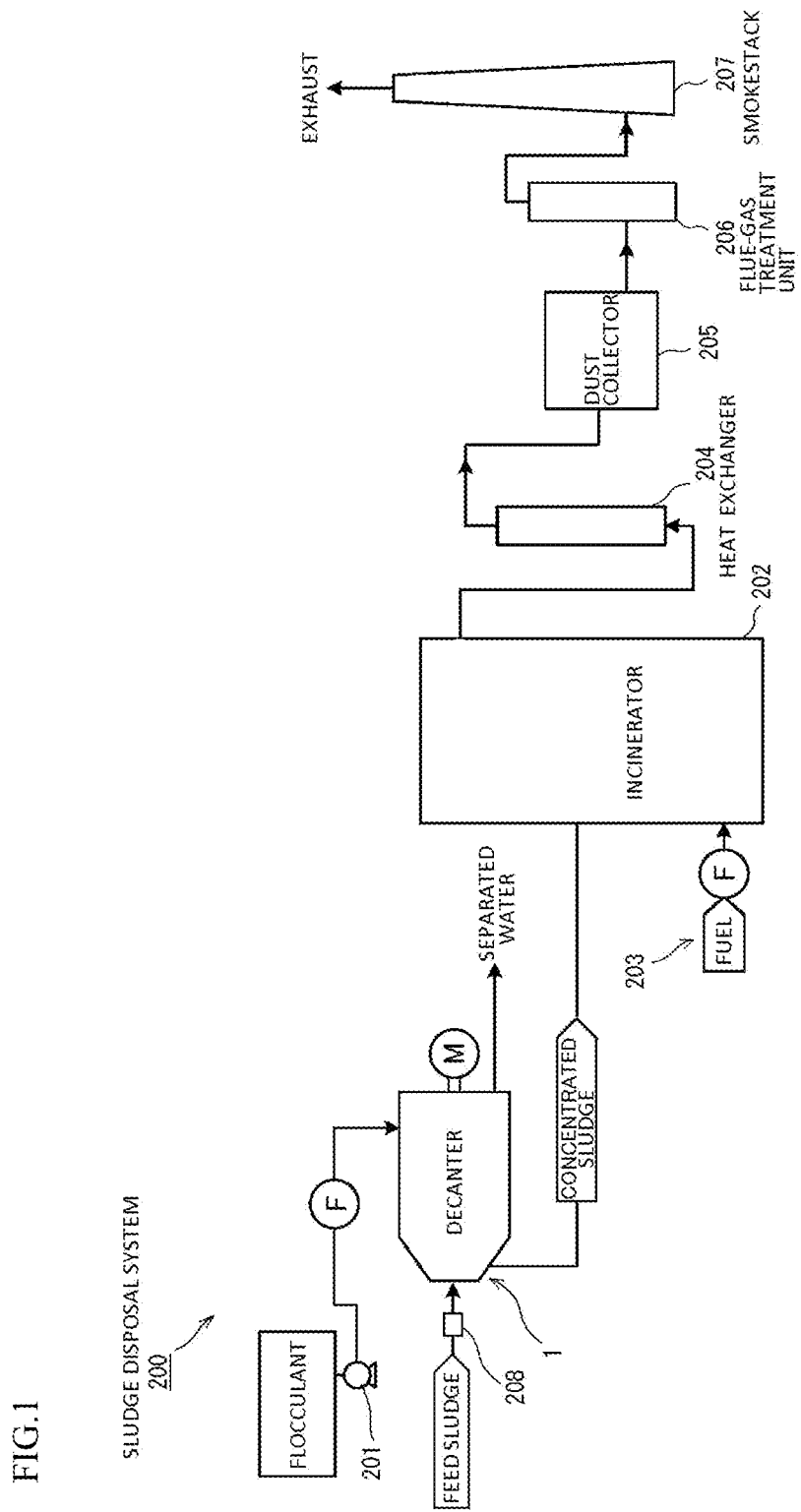
FIG. 1 shows an entire configuration of the sludge processing system according to an embodiment of the present invention.

FIG. 1 is a schematic view illustrating an entire configuration of the sludge processing system 200 comprising a centrifugal separator which concentrates the sludge and a furnace which performs a heat treatment on the concentrated sludge. In the following description, a configuration in which an incinerator is used as a furnace for the heat treatment on the concentrated sludge will be described as an example. However, the furnace should not be limited to the incinerator, and may be a carbonization furnace for carbonizing the sludge, a drying furnace for drying the sludge, a melting furnace, and the like.

FIG. 1 is a schematic view illustrating the entire configuration of the sludge processing system 200. The sludge processing system 200 is roughly classified into a concentration part for performing a concentration treatment on the sludge and an incineration part for incinerating the concentrated sludge (also referred to as the "thickened sludge"). The concentration part comprises a decanter 1 which is a preferable example of the centrifugal separator. The sludge which is a subject to be processed is fed into the decanter 1 by a sludge pump for example (not shown), and the concentrated sludge is exhausted to the outside of the decanter 1. In order to improve the concentration efficiency, any chemical such as a flocculant agent may be added using a chemical feed pump 201. For example, a polymeric flocculant agent, an inorganic flocculant agent such as Poly-ferric sulfate etc. may be used as the flocculant agent. The concentrated sludge exhausted to the outside of the decanter 1 may be conveyed to an incinerator 202 within the incineration part using a conveying means for example a pump etc., or otherwise may be conveyed to the incinerator 202 in a conveying manner utilizing the own weight of the concentrated sludge as above disclosed in Patent Literature 1. It should be noted that in some documents, the "concentration treatment" and a "dehydration treatment" are discriminated from each other based on the moisture content of the sludge after the treatment, but they are not discriminated herein and the "dehydration treatment" is defined as one aspect of the "concentration treatment".

The incineration part comprises the incinerator 202 which incinerates the concentrated sludge and a firework fuel feed means 203 which feeds any firework fuel into the incinerator 202 for promoting the combustion. The incineration part further comprises a heat recovery means which recovers the heat from the hot combustion gas exhausted from the incinerator 202. For example, as the heat recovery means, a heat exchanger 204 which exchanges the heat between the combustion gas and a heat recovery medium (for example, water) may be employed. The exhaust gas from which the heat is recovered is subjected to a detoxification treatment in a dust collector 205, a flue-gas treatment unit 206 and the like, and thereafter, emitted through a smokestack 207 to the atmosphere. It should be noted that the incinerator 202 does not require any special configuration as long as the concentrated sludge can be combusted and any known incinerator can be used. In general, the incinerator 202 is controlled to change an amount of the firework fuel to be added in accordance with the combustion state within the incinerator 202 in order to maintain the stable combustion state.

Figure 2:
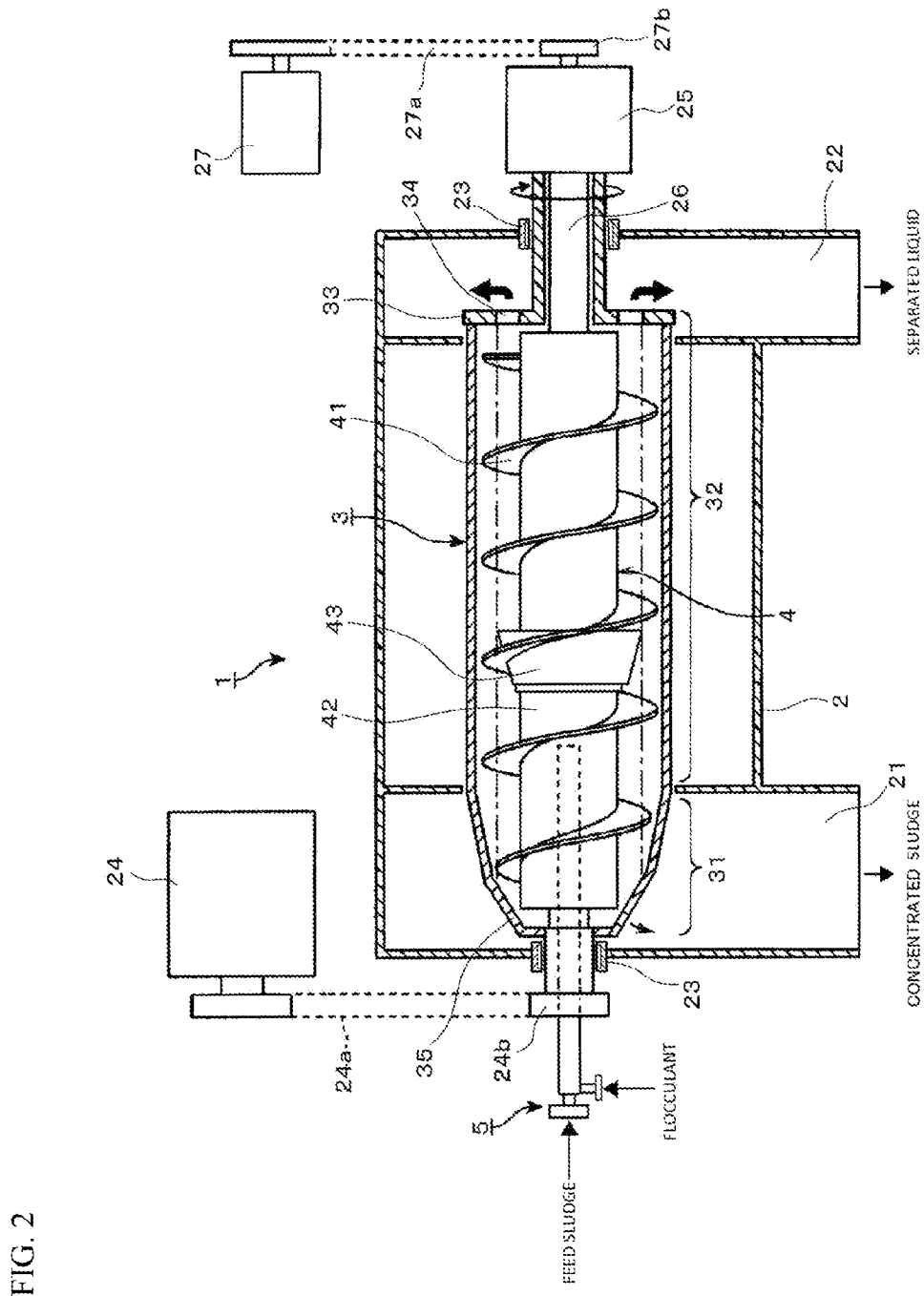
FIG. 2 shows an entire configuration of the decanter according to an embodiment of the present invention.

Referring to FIG. 2, a preferable configuration of the decanter 1 will be described hereinafter. The decanter 1 comprises a casing 2 having a concentrated sludge outlet 21 and a separated liquid outlet 22 formed on the lower part thereof, a bowl 3 which is a rotatable cylindrical body disposed within the casing 2, and a screw conveyor 4 which is a conveying means for the concentrated sludge to which a centrifugal force is applied within the bowl 3. The bowl 3 is supported by a bearing mechanism 23, for example, such as a bearing mounted on the casing 2, while the screw conveyor 4 is supported by a conveyer bearing (not shown). The bowl 3 and the screw conveyor 4 are configured to be rotatable about the horizontal axis coaxially, but independently from each other.

In this configuration, the power from a drive motor 24 as a drive mechanism is transmitted to a pulley 24b on the bowl 3 side via a rotating belt 24a, causing the bowl 3 to rotate at a predetermined rotation speed. Then, the power is further transmitted to the screw conveyor 4 via a gear box 25 which acts as a differential speed generator and a spline shaft 26, causing the bowl 3 and the screw conveyor 4 to rotate respectively at the relative differential speed.

A drive motor referred to as the back drive motor 27 is connected to the gear box 25 via a rotating belt 27a and a pulley 27b. The back drive motor 27 acts to reduce the rotation speed of the screw conveyor 4 lower than that of the bowl 3 by the torque of the rotating belt 27a rotating about a rotating shaft of the motor 27. The regenerative electric power which is generated by regenerative-braking the motor 27 is supplied to the drive motor 24, thereby the power consumption of the entire system can be reduced. However, in the case that the differential speed is generated only by the gear ratio of the gear box 25, the back drive motor 27 is not required.

The decanter 1 further comprises a feed nozzle 5 to feed the sludge which is a subject to be processed (feed sludge) and any flocculant agents into the howl 3. The feed nozzle 5 has for example a double-tube configuration and the feed sludge is fed to the inner flow path and the flocculant agent is fed to the outer flow path. The feed sludge is resulted from any water processing for, for example, water supply and sewerage, industrial wastewater, human waste and the like, and has the moisture content (sludge moisture) of approximately 95-99.5%. As the flocculant agent, a polymeric flocculant agent, an inorganic flocculant agent such as Poly-ferric sulfate etc. may be used, for example.

A trunk of the bowl 3 has a conical-shaped portion 31 formed on one end and a cylindrical portion 32 formed on the other end. An opening formed on the end of the cylindrical portion 32 is sealed by the circular plane referred to as the front hub 33. The front hub 33 and the cylindrical portion 32 form together a pool portion (liquid pool) in which the sludge is retained within the bowl 3. An exhaust port 34 for the separated liquid is formed on the front hub 33. Once the sludge is continuously fed into the bowl 3, the separated liquid is overflown from the exhaust port 34. A variable dam mechanism which variably controls an exhaust level height of the separated liquid may be disposed on the exhaust port 34.

On the other hand, a conical-shaped portion 31 of the bowl 3 acts as the beach portion on which the concentrated sludge conveyed by the screw conveyor 4 is separated from the liquid pool. An exhaust port 35 for the concentrated sludge is formed on a tip of the beach portion. However, the present embodiment may be used in the case that the bowl 3 has only the cylindrical portion 32 and does not have the conical-shaped portion 31.

A screw vane 41 which conveys and squeezes the sludge within the bowl 3 is formed spirally on the peripheral surface of a trunk portion 42 of the screw conveyor 4. The trunk portion 42 of the screw conveyor 4 has a cavity (i.e. buffer portion of the sludge, not shown) therein and a tip of the feed nozzle 5 extends into the buffer portion. When the sludge from the feed nozzle 5 is fed into the buffer portion, then the sludge is fed into the bowl 3 via the outlet passing through from the buffer portion to the peripheral surface of the trunk portion 42 and a short cone 43 formed in the vicinity of the center of the trunk portion 42 by the act of the centrifugal force. The flocculant agent also is fed into the short cone 43 via a different path from the sludge and mixed with the sludge within the short cone 43, thereafter the mixture is fed into the bowl 3. It should be noted that a long cone may be employed instead of the short cone, and the decanter 1 with no cone is possible.

The decanter 1 has a speed meter to measure the rotation speed of the bowl 3. The speed meter may employ a non-contact type rotation sensor as an example. The centrifugal force (G) applied to the sludge by the rotating bowl 3 can be computed by the equation: centrifugal force $(G)=r\times\omega^2/g=(r\times$ $N^2)/894$, wherein "N" denotes the rotation speed of the bowl 3 and "r" denotes a distance from the rotation shaft in a radial direction (i.e., the inner radial of the bowl). Since the inner radial (r) of the bowl 3 is determined by the design specification, the corresponding relationship between the centrifugal force (G) and the rotation speed (N) can be previously obtained using the above equation. In the present embodiment, the set value of the centrifugal force (G) is determined in performing the centrifugal separation, and the rotation speed (N) corresponding to the determined centrifugal force (G) is set to the set value as its control value. Thereafter, referring to the measured value of the speed meter, the drive motor 24 is inverter-controlled so that the bowl 3 rotates at the determined set value.

The decanter 1 also has a torque meter to measure the convey torque of the screw conveyor 4. The torque meter may employ a monitor output of the inverter torque as an example. The convey torque (i.e. concentrated sludge convey torque) of the screw conveyor 4 varies depending on the concentration state of the sludge within the bowl 3. In particular, when the sludge is concentrated too much, because the moisture content of the sludge within the bowl 3 is lower, the convey torque of the screw conveyor 4 becomes larger. In contrast, when the sludge is concentrated insufficiently, because the moisture content of the sludge within the bowl 3 is higher, the convey torque of the screw conveyor 4 becomes lower.

The concentration of the sludge fed into the decanter 1 (hereinafter, referred to as a feed sludge concentration) is measured continuously by the concentration meter 208 (see, FIG. 1). The feed sludge concentration indicates a concentration of the solid contained in the feed sludge. The feed sludge concentration falls in approximately 0.5-5 mass %. The concentration meter 208 may be disposed, for example, in such as the plumbing of the sludge connected to the feed nozzle 5, or in such as a sampling chamber for the sludge. A type of the concentration meter is not limited specifically and an ultrasonic concentration meter, a microwave concentration meter, or a laser concentration meter may be employed as an example.

Further, a mass flowmeter or a volume flowmeter is disposed in such as the plumbing of the sludge connected to the feed nozzle 5 and the flow rate of the sludge fed into the decanter 1 is continuously measured. A type of the flowmeter is not limited specifically and an electromagnetic flowmeter, a restriction flowmeter, or a weir flowmeter may be employed as an example. The flow rate of the sludge fed into the decanter 1 may be determined based on a daily sludge processing plan, for example. The flow rate of the sludge is adjusted for example by adjusting the opening position of the valve disposed in the plumbing of the sludge, or by inverter-controlling a rotating speed of a feed pump for the sludge.

Figure 3:
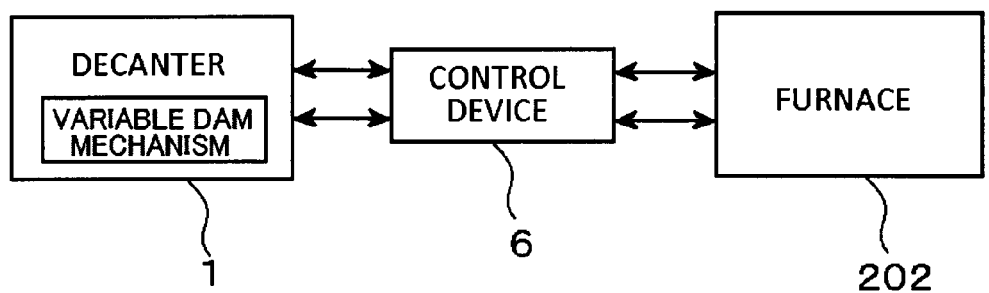
FIG. 3 shows the control device of the sludge processing system, FIG. 4 explains the automatic control based on the result of the measured moisture content, FIG. 5 explains the automatic control based on the result of the measured torque, FIG. 6 explains the automatic control based on the variation of the concentration of feed sludge.

As shown in FIG. 3, the sludge processing system 200 further comprises a control device 6 which is an automatic control device to control the decanter 1 and the incinerator 202 to operate optimally. The control device 6 receives, from the incinerator 202, the information regarding the combustion state of the concentrated sludge, which indicates the heat-treatment state of the concentrated sludge, and adjusts one or more control values selected from the centrifugal force (G) applied to the sludge by the bowl 3, the convey torque of the screw conveyor 4, the differential speed between the bowl 3 and the screw conveyor 4, and the chemical feed ratio. These control values may be set within the range between an upper limit value and a lower limit value. Such range involves an optimal value and the optimal value may be the upper limit value or the lower limit value. The control device 6 may comprise a computer apparatus including, for example, a CPU and a storage medium such as a memory or the like. The control device 6 stores any sequence program to perform an automatic control described hereinafter in its storage medium such as a memory or the like. The control device 6 also stores another sequence program to automatically control the entire operation of the decanter 1 in the storage medium such as a memory or the like.

[Control in Response to Moisture Content Change Request]

The information regarding the combustion state of the concentrated sludge may include the information regarding the moisture content of the concentrated sludge being fed into the incinerator 202 and the information about the moisture content requested by the incinerator 202. The information about the moisture content requested by the incinerator 202 may be a desired value of the moisture content, or a simple request to increase (or decrease) the moisture content. Once receiving any moisture content change request from the incinerator 202, the control device 6 adjusts one or more control values selected from the centrifugal force (G) applied to the sludge by the bowl 3, the convey torque of the screw conveyor 4, the differential speed between the bowl 3 and the screw conveyor 4, and the chemical feed ratio so as to obtain the concentrated sludge at the moisture content required by the incinerator 202 (target moisture content). If the information from the incinerator 202 is the simple request to increase (or decrease) the moisture content, the control device 6 sets the target moisture content with an increment (or a decrement) of a predetermined value (e.g., 1%), and adjusts the control value to achieve the target moisture content, thereby a feedback control is performed in which the subsequent request from the incinerator 202 is waited.

If the moisture content of the concentrated sludge being fed into the incinerator 202 is too low, the calorific power within the incinerator 202 is increased and the cooling load becomes higher. In some applications, the calorific power may be additionally utilized as the energy for power generation. In contrast, in the moisture content is too high, the combustion of the sludge is not completed and a great amount of the firework fuel is required. Therefore, based on whether or not the combustion state within the incinerator is good, the moisture content change request is sent to the decanter 1. An appropriate value of the moisture content is determined in accordance with the type of the furnace itself or the design specification. It should be noted that, in order to realize higher efficiency, the mode of operation of the sludge processing system 202 preferably involves the mode of operation to promote the energy saving (electric power saving), the mode of operation to promote the reduction of $CO_2$ emissions and the mode of operation to promote the reduction of running costs of the entire sludge processing system, and the moisture content change request should be performed based on which mode of operation is selected.

In the mode of operation to promote the energy saving (electric power saving), the target value for the total power consumption of the decanter 1 and the incinerator 202 is set, and each of the operational conditions of the decanter 1 and the incinerator 202 is controlled so that the set target value is achieved. As an example of the control, the target value of the moisture content is increased, thereby the power consumption of the decanter 1 is decreased.

In the mode of operation to promote the reduction of $CO_2$ emissions, an optimal point of the target value of $CO_2$ emissions is set using the following equation, and each of the operational conditions of the decanter 1 and the incinerator 202 is controlled so that the set target value is achieved.

$$CO_2 \text{ Emissions} = [\text{Total Power Consumption of Decanter and Incinerator} \times \text{Electric Power } CO_2 \text{ Basic Unit}] + [\text{Flocculant Agent used Amount} \times \text{Flocculant Agent } CO_2 \text{ Basic Unit}] + [\text{Firework Fuel used Amount} \times \text{Firework Fuel } CO_2 \text{ Basic Unit}]$$

In the mode of operation to promote the reduction of running costs of the entire sludge processing system, an optimal point of the target value of the running costs is set using the following equation, and each of the operational conditions of the decanter 1 and the incinerator 202 is controlled so that the set target value is achieved.

$$\text{Running Costs} = [\text{Total Power Consumption of Decanter and Incinerator} \times \text{Electric Power Unit Cost}] + [\text{Flocculant Agent used Amount} \times \text{Flocculant Agent Unit Cost}] + [\text{Firework Fuel used Amount} \times \text{Firework Fuel Unit Cost}]$$

[Control by Moisture Content Meter]

In a method of controlling so as to obtain the concentrated sludge at the target moisture content, the moisture content of the concentrated sludge exhausted from the decanter 1 is measured, for example, by a moisture content, meter, and one or more control values selected from the centrifugal force (G) applied to the sludge by the bowl 3, the convey torque of the screw conveyor 4, the differential speed between the bowl 3 and the screw conveyor 4, and the chemical feed ratio is subjected to a variable control so that the measured result achieves the target moisture content.

Figure 4:
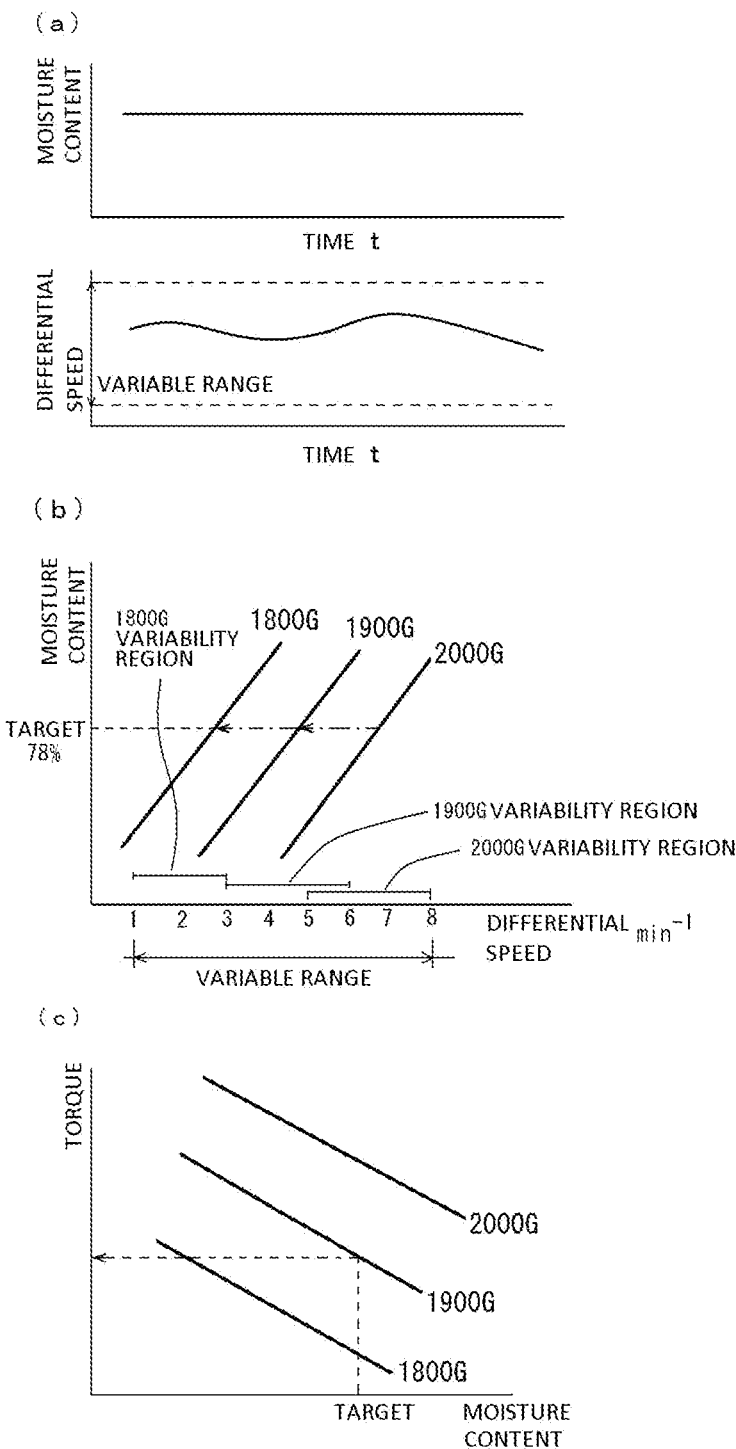

The lower centrifugal force (G) is preferably selected, because the target moisture content achieved with the low centrifugal force (G) results the more efficient energy saving (electric power saving). Then, as schematically shown in FIG. 4(*a*), the variable range (e.g., 1-8 $\text{min}^{-1}$) of the differential speed is previously set, and change the differential speed within the variable range so as to obtain the concentrated sludge of the target moisture content. In particular, there is a correlation relationship between the centrifugal force (G) and the convey torque and the moisture content as schematically shown in FIGS. 4(*b*) and 4(*c*). This correlation relationship can be obtained through a plant test. The information about the obtained correlation relationship is preferably stored previously in the memory of the control device 6. The control device 6 performs a constant moisture content control (or otherwise, a constant torque control). The constant moisture content control may be performed in conjunction with the constant torque control described hereinafter.

In a preferable example, when the system is operated with the target moisture content of 78% and the centrifugal force (G) of 2000 G for example, if the differential speed is changed within the predetermined range (e.g., 5-8 $\text{min}^{-1}$) and the control is performed to achieve the target moisture content (or, the moisture target within the target range) for a certain period of time (e.g., 1 hour), the control device 6 determines that the centrifugal force (G) can be decreased. Accordingly the centrifugal force (G) is decreased to 1900 G for example and the differential speed is subjected to the variable control so as to achieve the target moisture content at the centrifugal force (G) of 1900 G.

Furthermore, when the system is operated with the centrifugal force (G) of 1900 G, if the differential speed is changed within the predetermined range (e.g., 3-6 $\text{min}^{-1}$) and the control is performed to achieve the target moisture content (or, the moisture content within the target range) for a certain period of time (e.g., 1 hour), the control device 6 determines that the centrifugal force (G) can be more decreased. Accordingly, the centrifugal force (G) is decreased to 1800 G for example and the differential speed is subjected to the variable control so as to achieve the target moisture content at the centrifugal force (G) of 1800 G. If the differential speed is changed within the predetermined range (e.g., 1-3 $\text{min}^{-1}$) at the centrifugal force of 1800 G, the control device 6 keeps operating under the current controlling condition. However, if the differential speed remains at the minimum value (e.g., 1 $\text{min}^{-1}$) within the variable range and the moisture content is higher than the target moisture content, the control device 6 controls so that the centrifugal force (G) is increased. In this manner, the control device 6 repeats the control to gradually decrease the centrifugal force (G) so as to obtain the concentrated sludge with the target moisture content at the lower centrifugal force (G) possible within the set differential speed.

[Control through a Set Torque]

Figure 5:
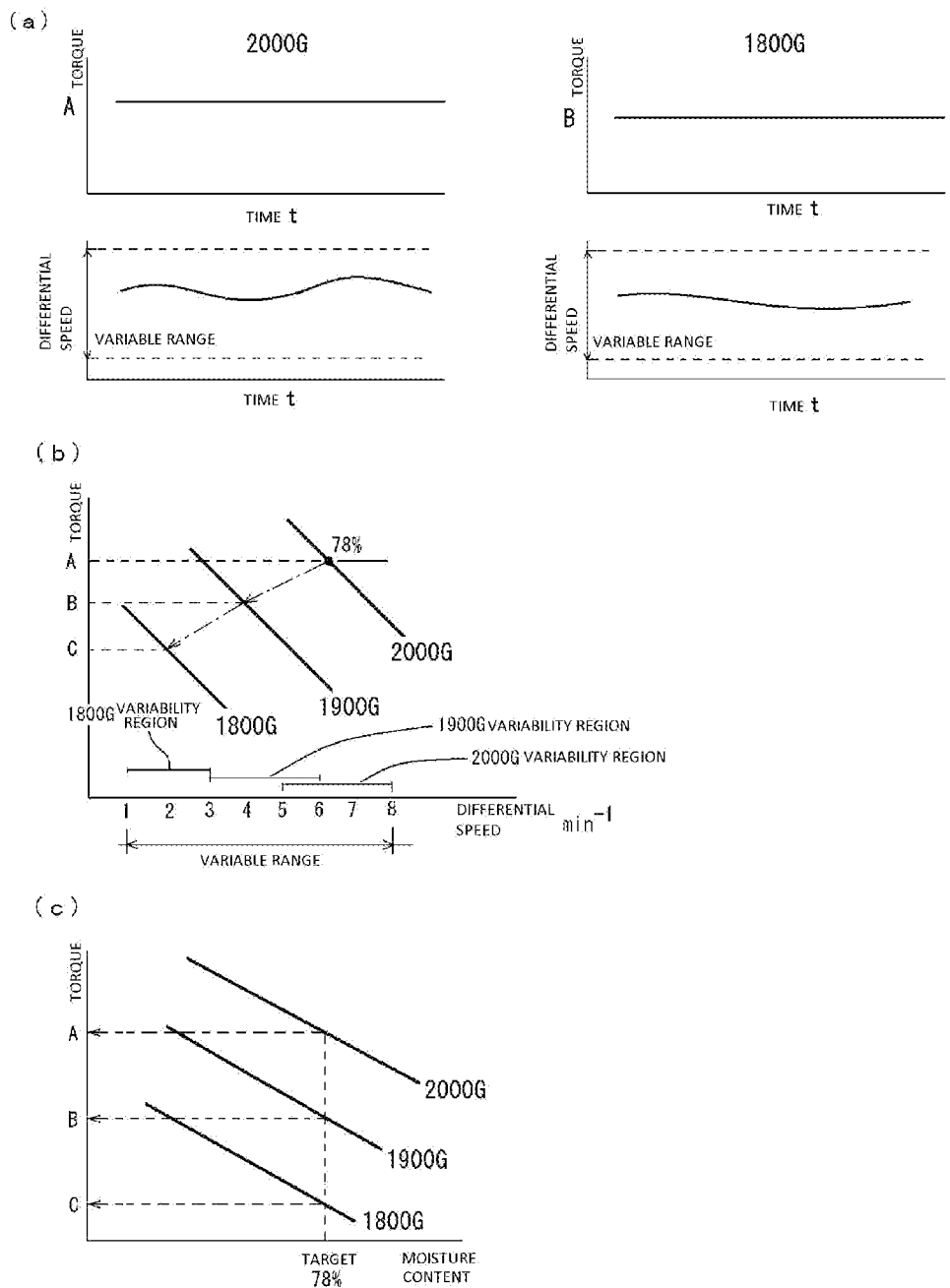

In the other control method to obtain the concentrated sludge with the target moisture content, instead of measuring the moisture content, the convey torque (detected value) measured by the torque meter may be used. This method is effective in case that the accuracy of the moisture content meter is not enough. In particular, since there is a correlation relationship between the centrifugal force (G) and the convey torque and the moisture content as schematically shown in FIGS. 5(*b*) and 5(*c*), the moisture content can be estimated based on the detected value of the convey torque. Therefore, the convey torque corresponding to the target moisture content is obtained based on the correlation relationship, and the control value of the convey torque is set. Then, as schematically shown in FIG. 5(*a*), the differential speed is subjected to the variable control so that the convey torque (detected value) measured by the torque meter achieves the set torque in accordance with the set value of the centrifugal force (G). That is, the variable range (between the maximum value and the minimum value) of the differential speed is predetermined, and even if the set value of the centrifugal force (G) is set differently (for example, to 2000 G, 1800 G or the like), the control is performed so that the differential speed is changed within this variable range, and the set torque is achieve. The set torque may be controlled to achieve the optimal value, or be variably controlled so as to fall between the predetermined upper limit value and the predetermined lower limit value. Since the convey torque value corresponding to the target moisture content depends on the degree of the centrifugal force (C), the set torque should be the convey torque which complies with the control value of the centrifugal force (G).

In a preferred example, when the system is operated with the centrifugal force (G) of 2000 G, if the differential speed is changed within the predetermined range (e.g., 5-8 $\text{min}^{-1}$) and the control is performed to achieve the to achieve the set torque (or, the torque within the target range) corresponding to the target moisture content. (e.g., 78%) for a certain period of time (e.g., 1 hour), the control device 6 determines that the centrifugal force (G) can be decreased. Accordingly, the centrifugal force (G) is decreased to 1900 G for example. However, since the change of the centrifugal force (G) leads to the vary of the torque corresponding to the target moisture content even if the moisture content is constant, the set torque is changed to the torque (torque B) corresponding to the target moisture content at the centrifugal force of 1900 G, for example, by use of the correlation relationship shown in FIG. 5(*c*). Then, the differential speed is subjected to the variable control so as to achieve the set torque (torque B) at the centrifugal force (G) of 1900 G. It should be noted that FIG. 5 illustrates the correlation relationship when the feed sludge concentration is at 1.5 mass % as an example.

Furthermore, when the system is operated with the centrifugal force (G) at 1900 G, if the differential speed is changed within the predetermined range (e.g., 3-6 min$^{-1}$) and the control is performed to achieve the set torque (or, the torque within the target range) for a certain period of time (e.g., 1 hour), the control device 6 determines that the centrifugal force (G) can be more decrease. Accordingly, the centrifugal force (G) is decreased to 1800 G, for example, as well as the set torque is changed to the torque (torque C) corresponding to the target moisture content at the centrifugal force of 1800 G, and the differential speed is subjected to the variable control so as to achieve the set torque (torque C) at the centrifugal force (G) of 1800 G. If the differential speed is changed within the predetermined range (e.g., 1-3 min$^{-1}$) at the centrifugal force of 1800 G, the control device 6 keeps operating under the current controlling condition. However, if the differential speed is at the minimum value (e.g., 1 min$^{-1}$) of the variable range and the measured torque is less than the set torque, the control device 6 controls so that the centrifugal force (G) is increased (at the centrifugal force of 1900 G, Torque B). In this manner, the control device 6 performs the control repeatedly so that, decreasing the centrifugal force (G) and modifying the set torque if the differential speed is larger within the variable range, and increasing the centrifugal force (G) if the differential speed is minimum value of the variable range and less than the set torque. Also, when the centrifugal force (G) is increased, the set torque is modified to achieve the torque corresponding to the target moisture content at the increased centrifugal force (G).

[Correction of Set Torque Based on Feed Sludge Concentration]

The basic operation for the constant torque control with the variable centrifugal force (G) is described above. This new constant torque control may be also performed in which the target moisture content is achieved with the minimum required centrifugal force through the variable control of the centrifugal force. In this new constant torque control, the control value of the torque would be also changed in accordance with the control value of the centrifugal force, in consideration that the changing of the centrifugal force leads to the varying of the torque even when the moisture content is constant. That is, correcting the correlation relationship between the moisture content and the torque based on the degree of the centrifugal force contributes to operating the entire sludge processing system efficiently.

However, in the actual operation, the correlation relationship between the moisture content and the torque is affected not only by the centrifugal force, but also by the concentration of the sludge to be fed into the decanter 100 (feed sludge concentration). Therefore, the moisture content of the concentrated sludge may deviate from the target value, when the feed sludge concentration is varied. The feed sludge concentration is varied depending on a treatment state of the process on the upstream from the decanter 100. If the variation of the feed sludge concentration is too large, it may be concerned that the constant torque control becomes ineligible by the negative effect due to the variation of the feed sludge concentration.

That is to say, since varying the feed sludge concentration causes varying the solid convey amount within the bowl 3, the higher feed sludge concentration causes the higher moisture content at the same torque value. In contrast, the lower feed sludge concentration causes the lower moisture content at the same torque value. Therefore, the correlation relationship between the moisture content and the torque using the feed sludge concentration as the parameter is illustrated as FIG. 6. The control device 6 previously stores the information about the correlation relationship between the moisture content and the torque on such as a memory or the like, and the stored information is used to correct the set torque in accordance with the variation of the feed sludge concentration. As an example, the respective correlation relationship at the centrifugal force (G) of 2000 G, 1900 G, and 1800 G are shown in FIG. 6. The control device 6 may have been stored the correlation relationship at any other centrifugal force (G) on the memory or the like. For the clarity, the respective correlation relationship is separately illustrated herein at the respective centrifugal force (G). However, the correlation relationship may be illustrated in the three-dimensional correlation diagram in which the moisture content is assigned to its X-axis, the torque is assigned to its Y-axis and the feed sludge concentration is assigned to its Z-axis using the centrifugal force (G) as the parameter.

In a preferred embodiment, the control device 6 receives the information about the result of the measured concentration from the concentration meter 208, and derives the set torque value corresponding to the concentration using the correlation relationship shown in FIG. 6. The derived set torque value is set as the new set torque. For example, for the target moisture content of 78%, the set torque at the centrifugal force (G) of 1900 G is Torque B (see FIG. 5). Although the Torque B is maintained as the set torque while the feed sludge concentration is stable maintained at 1.5 mass %, if the feed sludge concentration is varied from 1.5 mass % to 2.0 mass % for example, the set torque is changed to the torque (Torque B') corresponding to the target moisture content at the feed sludge concentration of 2.0 mass % by use of the correlation relationship shown in FIG. 6(b). In other words, the set torque is corrected. Such operation to correct the set torque based on the measured result for the feed sludge concentration may be configured to perform in any specified interval which is previously set (e.x., an interval of 30 minutes).

As described above, in the constant torque control, since the moisture content is estimated from the detected value of the convey torque, the adequate set torque is essential in order to obtain the sludge at the target moisture content. Therefore, as described the above embodiments, correcting the set torque through both the "centrifugal force" and the "feed sludge concentration", both of which may affect the correlation relationship between the moisture content and the torque, allows to achieve the set torque accurately corresponding to the target moisture content. That is, the effect of the variation of the feed sludge concentration on the constant torque control can be suppressed, thereby realizing the automatic control on the decanter at the optimal condition in accordance with the operation state of the incinerator.

[Operation for Constant Solid Processing Amount]

As described above, the main factor by which the feed sludge concentration affects on the moisture content and the torque is that the varying of the feed sludge concentration leads the varying of the solid convey amount within the bowl 3. Thus, in the present embodiment, instead of correcting the set torque as described above, the solid processing amount is set previously and operating the system so that, the solid processing amount is constant, thereby reducing the effect on the moisture content and the torque. In a proffered example, the control device 6 receives, from the concentration meter 208 and the flowmeter, the information about the result of the measured feed sludge concentration (kg/m$^3$) and the measured flow rate (math), then computes the solid processing amount (kg/h) using the received information. Further, the control device 6 adjusts the feed flow rate of the sludge so that the computing value is maintained the set value of the solid processing amount. Specifically, if the feed sludge concentration is lower, the flow rate is adjusted to increase, and if the feed sludge concentration is higher, the flow rate is adjusted to decrease. The set value of the solid processing amount may be set within the range between an upper limit value and a lower limit value.

According to the embodiments mentioned above, by performing the operation for the constant solid processing amount, the effect of the variation of the feed sludge concentration on the correlation relationship between the moisture content and the torque can be suppressed. This allows omitting the process to correct the set torque by use of the correlation relationship as shown in FIG. 6 and the configuration for such process. Further, the operation of the incinerators on subsequent process is stabilized by the constant solid processing amount.

Two specific embodiments has been described that can suppress the effect of the variation of the feed sludge concentration on the constant torque control. The system may be configured to comprise both the function to correct the set torque and the function to perform the constant solid processing amount operation, so that the operator may switch the control method appropriately.

Furthermore, in the case of the decanter 1 comprises the mentioned variable dam mechanism, the height of the dam (i.e., exhaustion level of the separated liquid) may be subjected to the variable controlled to achieve the target moisture content (or, the set torque).

The control device 6 may store previously the information indicative of the correlation relationship between the moisture content of the concentrated sludge and the chemical feed ratio of the flocculant agent on such as the memory or the like, determines the optimal chemical feed ratio corresponding to the target moisture content based on the correlation relationship, and sets the optimal chemical feed ratio to the control value, thereby controlling an amount of the flocculant agent to be added. Since the correlation relationship between the moisture content of the concentrated sludge and the chemical feed ratio of the flocculant agent depends on the kind of the flocculant agent used, it is preferable to obtain the correlation relationship through a plant test or the like.

[Control based on the VTS/TS]

The above described embodiments are the examples in which the control is performed in response to the moisture content change request from the incinerator. Hereinafter, an automatic control method based on the Volatile Total Solids/Total Solids (VTS/TS) of the concentrated sludge will be described in detail, as a modification of the mentioned control.

Figure 7:
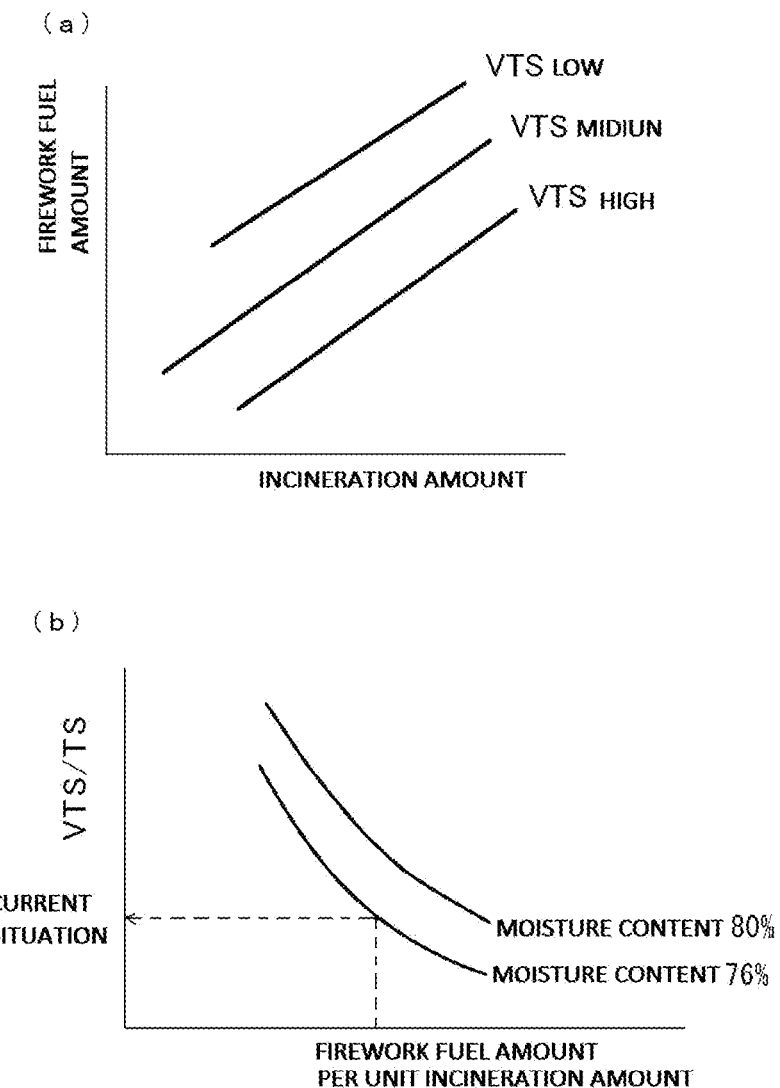
FIG. 7 is a characteristic diagram showing the correlation between firework fuel amount and incineration amount and between VTS/TS, FIG. 8 explains the automatic control based on VTS/TS.

That is to say, the incinerator 202 sends the information about the VTS/TS and the moisture content of the concentrated sludge being fed into the incinerator 202 to the control device 6, as the information regarding the combustion state of the concentrated sludge. Instead of the VTS/TS, the information required to compute the VTS/TS may be sent. The information required to compute the VTS/TS includes, for example, the information about the used amount of the firework fuel, the information about the sludge amount being fed into the incinerator, and the information about the moisture content of the concentrated sludge being fed into the incinerator. When the moisture content of the concentrated sludge remains at a certain value, the correlation relationship between the inclination amount and the firework fuel amount is proportional relationship, such as schematically illustrated in FIG. 7(a). In addition, the correlation relationship between the firework fuel amount per unit incineration amount and the VTS/TS is curved relationship, such as schematically illustrated in FIG. 7(b). Based on these correlation relationship described above, the current VTS/TS of the concentrated sludge can be computed from the incineration amount, the firework fuel amount, and the moisture content of the concentrated sludge.

As described above, the incinerator 202 is subjected to the control to change the firework fuel amount to be added in accordance with the combustion state, in order to maintain the stable combustion state. The VTS/TS and the moisture content of the concentrated sludge is one of the factors which varies the required amount of the firework fuel. If the VTS/TS of the concentrated sludge is high, since the calorific power of the concentrated sludge itself is high, the required amount of the firework fuel is decreased as long as the moisture content is constant. On the other hand, the concentration efficiency is degraded due to the dehydration resistance of the decanter 1. In contrast, if the VTS/TS of the concentrated sludge is low, the required amount of the firework fuel is increased. However, the dehydration is occurred easily, thereby the advantage that the concentration efficiency of the decanter 1 is enhanced. When the VTS/TS of the concentrated sludge is constant, if the moisture content is higher, the required amount of the firework fuel is increased, and if the moisture content is lower, the required amount of the firework fuel is decreased.

In this manner, the VTS/TS and the moisture content of the concentrated sludge relate closely to the stable operation of the incinerator 202. The varying of the VTS/TS and the moisture content of the concentrated sludge leads to the varying of the required amount of the firework fuel, thereby the operation of the incinerator 202 may become unstable. Therefore, in the present embodiment, based on the information about the VTS/TS and the moisture content of the concentrated sludge being sent from the incinerator, the appropriate moisture content for the incineration is determined as the target moisture content. Then, if the determined target moisture content is complied with the current moisture content which is informed from the incinerator, the current control value of the moisture content is maintained, but if the determined target moisture content is different from the current moisture content, the determined target moisture content is set to a new control value. The automatic control to obtain the concentrated sludge at the target moisture content is performed by adjusting one or more control values selected from the centrifugal force (G) applied to the sludge by the bowl 3, the convey torque of the screw conveyor 4, the differential speed between the bowl 3 and the screw conveyor 4, and the chemical feed ratio. Preferably, the automatic control in the present embodiment may be performed in the same manner as the automatic control method in response to the moisture content change request described above.

Figure 8:
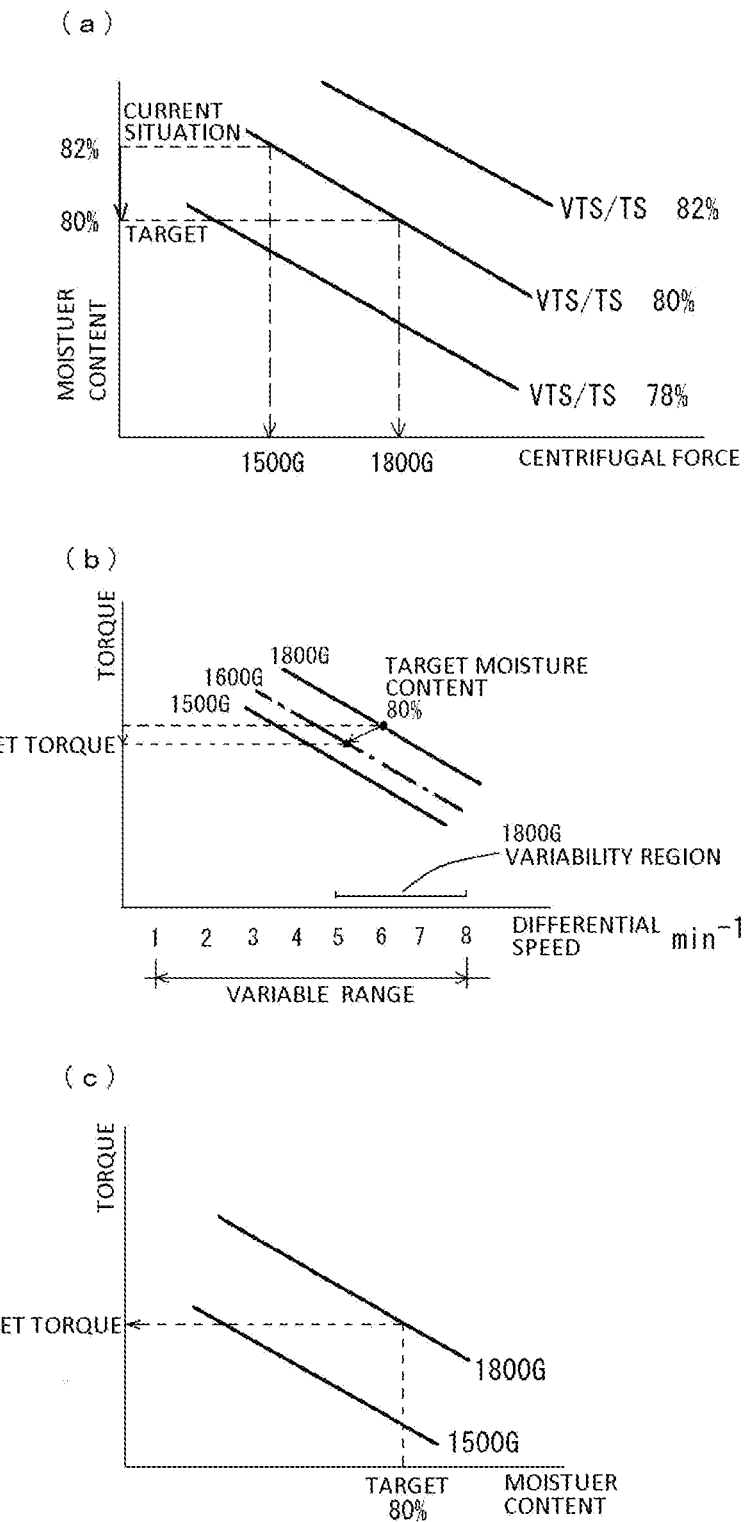

In a more preferable control method, based on the correlation relationship between the moisture content and the centrifugal force (G) using the VTS/TS as the parameter which is schematically illustrated FIG. 8, the optimal centrifugal force (G) to achieve the target moisture content is determined. If the VTS/TS is 80% and the moisture content which is informed from the incinerator is 82%, in the example shown in FIG. 8(a), the optimal centrifugal force (G) is 1500 G. Furthermore, if the target moisture content is set to 80%, since the optimal centrifugal force (G) is 1800 G, the control value of the centrifugal force (G) is changed to 1800 G.

Once the optimal centrifugal force (G) is determined, the control value of the convey torque is determined based on the target moisture content and the centrifugal force (G) with reference to FIG. 8(c). Then, as schematically illustrated in FIG. 8(b), the differential speed is subjected to the variable control so that the convey torque measured by the torque meter (detected value) is constant at the control value, in the same manner as the mentioned control based on the set torque. The set torque may be controlled so as to achieve the optimal value, or otherwise be variably controlled so as to fall within the range between the predetermined upper limit value and the predetermined lower limit value. In addition, if possible, as illustrated also in FIG. 8(b), the control in which the centrifugal force is gradually decreased (for example, from 1800 G to 1600 G) is performed so as to achieve the set torque with the lower centrifugal force possible in the same manner as the mentioned control based on the set torque. Instead of the control based on the set torque, the control using the moisture content meter as mentioned above may be performed. In addition, the control based on the set torque and the control using the moisture content meter may be performed in combination.

Figure 9:
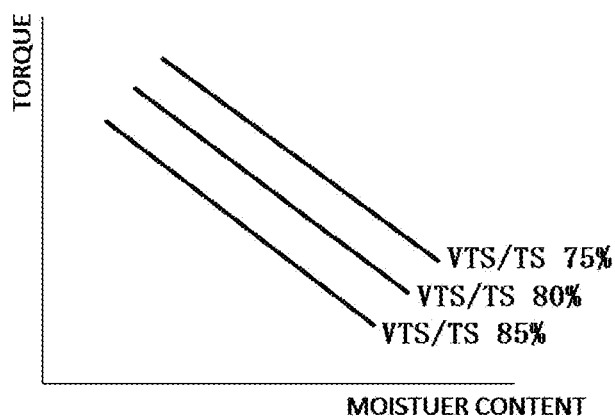
FIG. 9 is a characteristic diagram showing the correlation implementing adjust of set torque based on VISITS.

The VTS/TS of the concentrated sludge is one of the factors that affect the correlation relationship between the moisture content and the torque, similarly to as the centrifugal force (G) and the feed sludge concentration as mentioned above. Therefore, in case that, the set torque may be corrected in accordance with the VTS/TS of the concentrated sludge, the more adequate control may be performed. In a preferred example, the correlation relationship between the moisture content and the torque using the VTS/TS of the concentrated sludge as the parameter shows the relationship as schematically illustrated in FIG. 9. The automatic control device 6 previously stores the information about this correlation relationship as the information to correct the set torque bases on the VTS/TS of the concentrated sludge on such as the memory or the like, and corrects the set torque in accordance with the variation of the VTS/TS of the concentrated sludge, or otherwise so as to correspond to the record of the measured VTS/TS.

Figure 10:
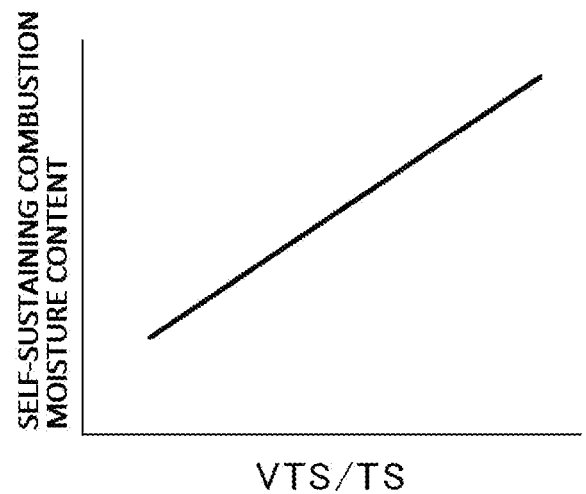
FIG. 10 is a characteristic diagram showing the correlation between VIS/TS and the self-sustaining combustion moisture content.
Figure 11:
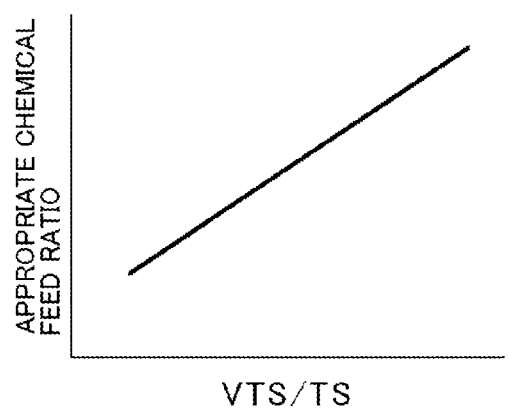
FIG. 11 is a characteristic diagram showing the correlation between VIS/TS and the appropriate chemicals feeding rate.
Figure 12:
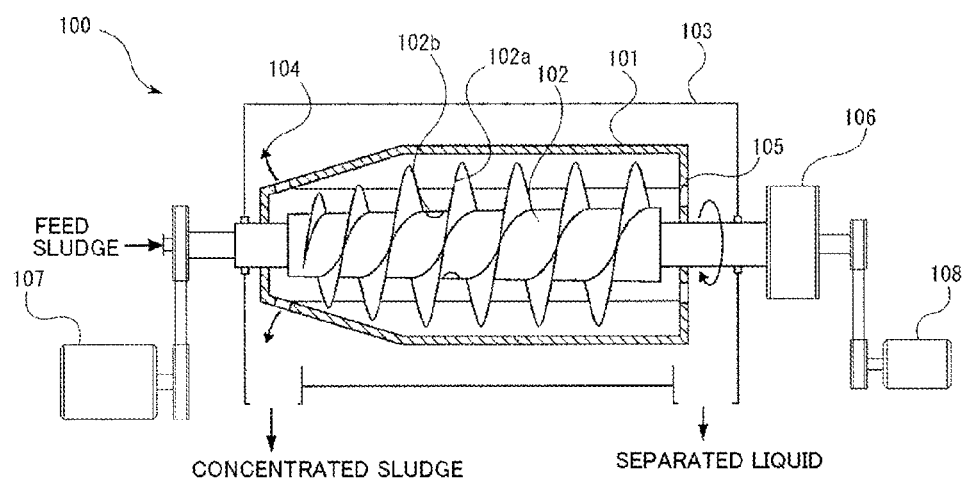
FIG. 12 shows a schematic configuration of decanter.

As an example, the target moisture content which is determined based on the VTS/TS may be a self-sustaining combustion moisture content which can be derived from the VTS/TS. That is to say, the correlation relationship between the VTS/TS and the self-sustaining combustion moisture content of the concentrated sludge is proportional relationship as schematically illustrated in FIG. 10. Based on this correlation relationship, the target moisture content is determined and the centrifugal force (G) is determined with which the self-sustaining combustion moisture content may be achieved. In addition, since the VTS/TS and the chemical feed ratio have a correlation relationship as schematically illustrated in FIG. 11, the chemical amount to be added may be controlled by setting the optimal chemical feed ratio corresponding to the VTS/TS to the control value.

Furthermore, the target moisture content may be determined based on the mode of operation of the sludge processing system 202, as described above.

According to the above mentioned embodiments, the present system comprises the control device 6, wherein the control device 6 receives, from the incinerator 202, the information regarding the combustion state of the concentrated sludge and adjusts one or more control values selected from the centrifugal force (G) applied to the sludge by the bowl 3, the convey torque of the screw conveyor 4, the differential speed between the bowl 3 and the screw conveyor 4, and the chemical feed ratio. This allows the automatic control in which the operational condition of the decanter 1 is set to the optimal condition in accordance with the operational state of the incinerator 202. As a result, the energy saving of the entire system, the reduction of $CO_2$ emissions of the entire system, and the reduction of running costs of the entire system can be promoted.

According to the above described embodiments, when the control device receives, from the incinerator 202, the information regarding the combustion state of the concentrated sludge and performs the constant torque control on the decanter 1, by correcting the set torque through both the "centrifugal force" and the "feed sludge concentration", both of which may affect the correlation relationship between the moisture content and the torque, the set torque accurately corresponding to the target moisture content can be achieve. That is, the effect of the variation of the feed sludge concentration on the constant torque control can be suppressed. This can cause the automatic control of the operational condition of the decanter 1 to be the optimal condition which compiles to the operation state of the incinerator 202. As a result, the energy saving of the entire system, the reduction of $CO_2$ emissions of the entire system, and the reduction of running costs of the entire system can be promoted. In addition, when the information regarding VTS/TS may be obtained from the incinerator, the correlation relationship between the moisture content and the concentrated sludge convey torque can be corrected also through the VTS/TS. This can cause the automatic control be the optimized.

While the present invention has been described in detail in conjunction with specific embodiments, it is apparent to persons of ordinary knowledge in this technological field that various substitutions, modifications, changes, and the like to the forms and details can be made without departing from the spirit and scope of the invention that are defined in the description of claims. Therefore, the scope of the invention is not limited to the above-described embodiments and the accompanying drawings but should be defined by the claims and their equivalents.

DESCRIPTION OF REFERENCE NUMERALS 1 decanter
2 casing
3 bowl
4 screw conveyor
5 feed nozzle
6 control device
200 sludge disposal system
202 incinerator

What is claimed is:

1. A sludge processing system comprising:
a centrifugal separator which concentrates sludge,
a concentration measure device which measures the moisture content of the concentrated sludge exhausted from the centrifugal separator,
a furnace which heat-treats the concentrated sludge, and
an automatic control device which receives, from the furnace, information regarding a heat-treatment state of the concentrated sludge and controls the centrifugal separator based on the received information,
wherein the centrifugal separator includes a bowl by which centrifugal force is applied to the sludge so as to separate the sludge into the concentrated sludge and a separated liquid, a screw conveyor to convey the concentrated sludge contained in the bowl toward an exhaust port, a drive motor to rotate the bowl, and a differential speed generator to cause the screw conveyor to rotate at a differential speed relative to the bowl,
wherein the received information includes a moisture content change request of the concentrated sludge, and
wherein, in response to the moisture content change request, the automatic control device controls as follow (a) to (c):

(a) the automatic control device sets a variable range of the differential speed between the bowl and the screw conveyor, and performs a variable control of the differential speed so that the measured moisture content of the concentrated sludge achieves the moisture content requested by the furnace within the set variable range, (b) the automatic control device performs the variable control of the differential speed so that, when the differential speed varies within a certain range being previously set and the measured moisture content of the concentrated sludge maintains the moisture content requested by the furnace for a certain period of time being previously set, a control value of the centrifugal force is decreased so that the measured moisture content of the concentrated sludge achieves the moisture content requested by the furnace at the decreased centrifugal force, and (c) the automatic control device performs the variable control of the differential speed so that, when the differential speed remains at a minimum value within the set variable range and the measured moisture content of the concentrated sludge is higher than the moisture content requested by the furnace, the control value of the centrifugal force is increased so that the measured moisture content of the concentrated sludge achieves the moisture content requested by the furnace at the increased centrifugal force.

2. The sludge processing system according to claim 1, wherein the automatic control device further performs a control to adjust a chemical feed ratio so as to achieve the moisture content requested by the furnace.

3. The sludge processing system according to claim 1, wherein
the centrifugal separator further includes a variable dam mechanism for adjusting an exhaust level of the separated liquid of the bowl, and
the automatic control device further performs a control to adjust the exhaust level of the separated liquid of the bowl so as to achieve the moisture content requested by the furnace.

4. The sludge processing system according to claim 1, wherein the furnace send the moisture content change request regarding the concentrated sludge to the automatic control device based on one or more of power consumptions, $CO_2$ emissions and running costs for both of the centrifugal separator and the furnace.

5. A sludge processing system comprising:
a centrifugal separator which concentrates sludge,
a concentration measure device which measures the moisture content of the concentrated sludge exhausted from the centrifugal separator,
a furnace which heat-treats the concentrated sludge, and
an automatic control device which receives, from the furnace, information regarding a heat-treatment state of the concentrated sludge and controls the centrifugal separator based on the received information,
wherein the centrifugal separator includes a bowl by which centrifugal force is applied to the sludge so as to separate the sludge into the concentrated sludge and a separated liquid, a screw conveyor to convey the concentrated sludge contained in the bowl toward an exhaust port, a drive motor to rotate the bowl, and a differential speed generator to cause the screw conveyor to rotate at a differential speed relative to the bowl,
wherein the received information includes a moisture content of the concentrated sludge fed into the furnace and VTS/TS (Volatile Total Solids/Total Solids) or information required to compute the VTS/TS of the concentration sludge, the automatic control device determines either a current target value of the moisture content is maintained or a new target value is set based on VTS/TS of the concentrated sludge and controls as follow (a) to (c):

(a) the automatic control device sets a variable range of the differential speed between the bowl and the screw conveyor, and performs a variable control of the differential speed so that the measured moisture content of the concentrated sludge achieves the moisture content requested by the furnace within the set variable range, (b) the automatic control device performs the variable control of the differential speed so that, when the differential speed varies within a certain range being previously set and the measured moisture content of the concentrated sludge maintains the moisture content requested by the furnace for a certain period of time being previously set, a control value of the centrifugal force is decreased so that the measured moisture content of the concentrated sludge achieves the moisture content requested by the furnace at the decreased centrifugal force, and (c) the automatic control device performs the variable control of the differential speed so that, when the differential speed remains at a minimum value within the set variable range and the measured moisture content of the concentrated sludge is higher than the moisture content requested by the furnace, the control value of the centrifugal force is increased so that the measured moisture content of the concentrated sludge achieves the moisture content requested by the furnace at the increased centrifugal force.

6. The sludge processing system according to claim 5, wherein
the automatic control device further previously stores information indicative of a correlation relationship between the moisture content of the concentrated sludge and the centrifugal force of the bowl using the VTS/TS as a parameter, and
the automatic control device sets a control value of the centrifugal force of the bowl based on an optimum centrifugal force corresponding to both of the VTS/TS and the target moisture content.

7. The sludge processing system according to claim 5, wherein
the automatic control device further previously stores the information indicative of a correlation relationship between the VTS/TS and a self-sustaining combustion moisture content, and
the automatic control device computes the self-sustaining combustion moisture content based on the VTS/TS, and sets the computed self-sustaining combustion moisture content to a new target moisture content of the concentrated sludge.

8. The sludge processing system according to claim 5, wherein the required information to compute the VTS/TS of the concentrated sludge comprises information about each of a used amount of a firework fuel, an amount of a feed sludge to the furnace, and the moisture content of the concentrated sludge fed into the furnace.

9. The sludge processing system according to claim 5, wherein the automatic control device further previously stores information indicative of a correlation relationship between the VTS/TS and a chemical feed ratio, and
the automatic control device performs a control to adjust an amount of the chemical to be added by setting an optimum chemical feed ratio corresponding to the VTS/TS which is the received information from the furnace or the computed VTS/TS.

10. The sludge processing system according to claim 5, wherein
the centrifugal separator further includes a variable dam mechanism for adjusting an exhaust level of the separated liquid of the bowl, and
the automatic control device further performs a control to adjust an exhaust level of the separated liquid of the bowl so as to achieve the target moisture content.

11. A non-transient storage medium storing a program for controlling an operation of a sludge processing system, the sludge processing system comprising:
a centrifugal separator which concentrates sludge,
a concentration measure device which measures the moisture content of the concentrated sludge exhausted from the centrifugal separator,
a furnace which heat-treats the concentrated sludge, and
an automatic control device which receives, from the furnace, information regarding a heat-treatment state of the concentrated sludge and controls the centrifugal separator based on the received information,
wherein the centrifugal separator includes a bowl by which centrifugal force is applied to the sludge so as to separate the sludge into the concentrated sludge and a separated liquid, a screw conveyor to convey the concentrated sludge contained in the bowl toward an exhaust port, a drive motor to rotate the bowl, and a differential speed generator to cause the screw conveyor to rotate at a differential speed relative to the bowl,
wherein the received information includes a moisture content change request of the concentrated sludge, and
wherein, in response to the moisture content change request, the program for controlling the operation of the sludge processing system causes the automatic control device to perform as follow (a) to (c):
wherein, in response to the moisture content change request, the program for controlling the operation of the sludge processing system causes the automatic control device to perform as follow:
(a) the automatic control device sets a variable range of the differential speed between the bowl and the screw conveyor, and performs a variable control of the differential speed so that the measured moisture content of the concentrated sludge achieves the moisture content requested by the furnace within the set variable range,
(b) the automatic control device performs the variable control of the differential speed so that, when the differential speed varies within a certain range being previously set and the measured moisture content of the concentrated sludge maintains the moisture content requested by the furnace for a certain period of time being previously set, a control value of the centrifugal force is decreased so that the measured moisture content of the concentrated sludge achieves the moisture content requested by the furnace at the decreased centrifugal force, and
(c) the automatic control device performs the variable control of the differential speed so that, when the differential speed remains at a minimum value within the set variable range and the measured moisture content of the concentrated sludge is higher than the moisture content requested by the furnace, the control value of the centrifugal force is increased so that the measured moisture content of the concentrated sludge achieves the moisture content requested by the furnace at the increased centrifugal force.

* * * * *